United States Patent [19]

Rhodes et al.

[11] Patent Number: 5,302,667
[45] Date of Patent: Apr. 12, 1994

[54] ASYMMETRICAL RADIAL POLYMER AND COMPOSITION OF MATTER COMPRISING THE SAME

[75] Inventors: Robert B. Rhodes; Arthur R. Bean, both of Houston, Tex.

[73] Assignee: Shell Oil Company, Houston, Tex.

[21] Appl. No.: 130,321

[22] Filed: Oct. 1, 1993

Related U.S. Application Data

[63] Continuation of Ser. No. 938,558, Aug. 28, 1992, abandoned, which is a continuation of Ser. No. 509,528, Apr. 16, 1990, abandoned.

[51] Int. Cl.$^5$ .......................................... C10M 143/12
[52] U.S. Cl. .................................... 525/314; 252/43
[58] Field of Search ........................... 525/314; 252/43

[56] References Cited

U.S. PATENT DOCUMENTS

| | | | |
|---|---|---|---|
| 3,985,830 | 10/1976 | Fetters et al. | 260/880 B |
| 4,010,226 | 3/1977 | Crosslano et al. | 525/316 |
| 4,116,917 | 9/1978 | Eckert | 260/33.6 AQ |
| 4,156,673 | 5/1979 | Eckert | 260/33.6 AQ |
| 4,391,949 | 7/1983 | St. Clair | 525/99 |
| 4,444,953 | 4/1984 | St. Clair | 525/98 |
| 4,620,048 | 10/1986 | Ver Strate et al. | 585/10 |
| 4,849,481 | 7/1989 | Rhodes et al. | 525/250 |
| 4,877,836 | 10/1989 | Rhodes | 525/89 |
| 4,891,410 | 1/1990 | Bronstert et al. | 525/314 |

OTHER PUBLICATIONS

Anionic Synthesis of Functionalized Heteroarm Star Polymers, by R. P. Quirk, L. E. Schock and B. Lee, Inst. of Poly. Sci., Akron.

*Primary Examiner*—Vasu S. Jagannathan

[57] ABSTRACT

An improved VI improver and a fluid composition comprising the VI improver. The VI improver is an asymmetric radial polymer comprising a plurality of arms having at least two distinctly different peak molecular weights, which arms are chemically the same. The weight ratio of a longest set of arms and a first set of shorter arms will vary within the range from about 1.2:1 to about 8.0:1. If more than one set of shorter arms is used the ratio of adjacent arms molecular weights will vary within the same range. While the arm might be essentially any polymer, polymers of conjugated diolefins and copolymers of at least one monoalkenyl aromatic hydrocarbon and at least one conjugated diolefin are preferred. Conjugated diolefin homopolymers are preferred and polyisoprene is most preferred.

2 Claims, No Drawings

ASYMMETRICAL RADIAL POLYMER AND COMPOSITION OF MATTER COMPRISING THE SAME

This is a continuation of application Ser. No. 07/938,558, filed Aug. 28, 1992, now abandoned, which is a continuation of applications Ser. No. 07/509,528, filed Apr. 16, 1990, now abandoned.

BACKGROUND OF THE INVENTION

1. Field of the Invention

This invention relates to an asymmetric polymer and to a composition of matter comprising the same. More particularly, this invention relates to an asymmetric polymer which will alter the viscoelastic properties of a composition of matter comprising the same and to a composition of matter comprising the same.

2. Prior Art

Methods for varying the elasticity of polymers are, of course, well known in the prior art and such methods are taught in U.S. Pat. No. 4,620,048. The invention described in U.S. Pat. No. 4,620,048 has been described by reference to polymeric viscosity index (V.I.) improver additives and patentees clearly indicate that the parameters which affect elasticity of the polymer will interact to affect the viscoelastic properties of a composition containing the polymer. One such parameter is molecular topology. The thrust of the invention described in U.S. Pat. No. 4,620,048 seems to be that mechanical degradation of the polymer may be reduced if the compliance of the polymer is reduced or if the molecular weight of the polymer is narrowed. There is, apparently, no indication in U.S. Pat. No. 4,620,048 that the performance of such a polymer might show even further improvement as a V.I. improver as a result of the improved elastic property, per se, at least in certain cases as when used in a lubricating composition lubricating journal bearings. The thrust of the present invention, then, resides in this latter discovery with the polymer of this invention.

It is well known in the prior art that a reduction in HTHSR viscosity will improve fuel efficiency. This is taught for example in ASTM Data Series Publication, DS62 "The Relationship Between High Temperature Oil Rheology and Engine Operation" published in 1984 and confirmed in the paper by D. C. Olson, SAE Paper, 87128. A mere reduction in HTHSR viscosity will, however, genereally result in an increase in journal bearing wear in an automotive engine.

More recently, it has been established that bearing oil film thickness, which affects bearing wear, is proportionate to both the HTHSR viscosity and the oil elasticity. This is taught in SAE Paper 860376, by Bates et al. This discovery too is confirmed by the aforementioned Olson Paper. It follows from this discovery that improved journal bearing wear could be realized if the oil elasticity could be increased while maintaining the same HTHSR viscosity and improved fuel efficiency could be realized and journal bearing wear maintained with a lower HTHSR viscosity by increasing the oil elasticity. The aforementioned U.S. Pat. No. 4,620,048 does teach that oil viscoelastic properties of an oil can be changed by changing the topology of the polymer added to the oil as can the shear stability of the oil composition. There is, however, no teaching or suggestion in this patent that both fuel efficiency and bearing wear can be improved if the proper topology is selected.

In light of the foregoing, a need remains for a polymer which can be added to an oil and improve the oil fuel efficiency while maintaining or improving journal bearing wear properties.

SUMMARY OF THE INVENTION

In accordance with this invention, improved fuel efficiency and improved viscoelastic properties can be achieved in a fluid composition of matter by incorporating an asymmetric radial polymer which is sometimes hereinafter referred to as a star-shaped polymer. The polymer which is incorporated will be asymmetric with respect to molecular weight of the arms, which arms may be homopolymers or copolymers. When the arms are homopolymers, the arm will be a polymer of a conjugated diolefin. When the arms are copolymers, the copolymer may be two or more conjugated diolefins or one or more alkenyl aromatic hydrocarbon monomers and one or more conjugated diolefins.

DETAILED DESCRIPTION OF THE INVENTION

As indicated supra, the present invention relates to an asymmetric radial polymer and to a composition of matter comprising said polymer. The asymmetric radial polymer is asymmetric with respect to peak molecular weight of the arms and, hence, contains polymeric arms of at least two different peak molecular weights. In the asymmetric radial polymer as envisioned, all of the arms in the polymer will be chemically the same, but will vary with respect to peak molecular weight. Chemically, the polymer arms may be homopolymers or copolymers. When the polymer arms are homopolymers, the arms will be conjugated diolefin polymers. When the arms are copolymers, the arms may be copolymers of two or more conjugated diolefins or copolymers of one or more alkenyl aromatic hydrocarbon monomers and one or more conjugated diolefins. In all cases, the ethylenic unsaturation contained in the polymer after preparation of the arms, will be hydrogenated such that at least 90% thereof is converted or hydrogenated.

In general, the longer arms of the asymmetric radial polymer, independent of chemical composition, will have peak molecular weights within the range from about 40,000 to about 200,000. At least one set of shorter arms of the asymmetric radial polymer will have peak molecular weights within the range from about 5,000 to about 80,000 with the proviso that the ratio of peak molecular weight of the longer arms to the shorter arms be within the range from about 1.2:1 to about 8:1. The asymmetric radial polymer may, of course, comprise additional sets of lower molecular weight arms and when such additional sets are present, the peak molecular weight thereof will vary relative to the next preceding set of low molecular weight arms in the same manner as that next preceding set varied relative to the still next preceding set. In any case, the asymmetric radial polymer useful in the composition of this invention will comprise from about 6 to about 12 arms as determined by GPC or from about 10 to about 22 arms as determined using light scattering techniques and from about 1 to about 18 of these total arms as determined using light scattering techniques (10 to about 80%) will be the longer arms while the remaining 2 to about 20 arms as determined by light scattering techniques (20 to about 90%) will be the shorter arms.

In general, the star shaped polymers of this invention which are useful as VI improvers may be prepared using techniques well known in the prior art, such as the processes taught in U.S. Pat. Nos. 3,985,830; 4,116,917; 4,156,673; 4,391,949; and 4,444,953, the disclosure of which patents are herein incorporated by reference. A suitable process is, then, a process comprising the following steps:

a) Preparing living polymers (polymers containing an alkaline metal therein) useful as arms, which polymers may be homopolymers or copolymers, the alkaline metal contained in the polymer being suitably disposed to insure incorporation of the arm into or at the nucleus at the desired point, the peak molecular weight of the arms of said polymer being controlled so as to produce a set of high molecular weight arms;

b) repeating step a) at least once except with respect to molecular weight so as to produce at least one set of low peak molecular weight polymer arms;

c) combining the living polymers from steps a) and b) with a suitable coupling agent and reacting the mixture to form a star shaped polymer and d) selectively hydrogenating the star shaped polymer thus formed to produce selectively hydrogenated star shaped polymer containing hydrogenated conjugated diolefin monomer units.

Another suitable process for preparing the asymmetric radical polymer of this invention is to first prepare a short arm asymmetric radial polymer and then growing a portion of the short arm to a higher molecular weight using techniques such as those taught in U.S. Pat. No. 4,877,836.

As is well known, convention techniques may be used to control the peak molecular weights of the polymer arms prepared in steps a) and b) above. These techniques, of course, involve controlling the amount of monomer and catalyst added during the polymerization process. The general concept applies equally well to the preparation of homopolymers and copolymers, which copolymers may be block copolymers, although the technique actually used may be somewhat more sophisticated when living techniques are used to prepare a block copolymer. In this latter regard, then, it should be noted that the molecular weight of the first block will always be controlled by controlling the amount of monomer and catalyst added thereto while the molecular weight of the second and subsequent blocks can be controlled simply by controlling the amount of monomer added for polymerization. Methods for preparing arms for radial polymers are, of course, clearly taught in the aforesighted U.S. patents. Variation of the methods actually taught to produce a mixture of arms having at least two different molecular weights is, of course, well within the ordinary skill of the art.

While a host of methods could be used to prepare radial polymers—all involving reaction of a suitable functional group in the polymer and the coupling agent, formation of a radial polymer by reacting a living polymer with a poly(poly-alkenyl coupling agent) as taught in the aforementioned U.S. patents is preferred. As indicated in these patents, then, a suitable monomer or combination thereof is combined with an anionic initiator in a suitable solvent and polymerized to form a living polymer arm. The living polymer arm is then reacted with a polyalkenyl coupling agent to form a star shaped polymer which is then hydrogenated to convert or saturate at least about 90% of the ethylenic unsaturation initially contained therein.

According to the disclosure of these patents, suitable anionic initiators include alkali metal hydrocarbon compounds and such compounds wherein lithium is the alkali metal are preferred. Preferred lithium compounds, then, include alkenyl lithium compounds such as allyl lithium, methallyl lithium and the like; aromatic lithium compounds such as phenyl lithium, the xyllyl lithiums, the napthyl lithiums, and the like; alkyl lithiums such as methyl lithium, ethyl lithium, propyl lithium, butyl lithium, amyl lithium, hexyl lithium, 2-ethyl hexyl lithium and the like; and similar lithium compounds. Secondary-butyl lithium is a most preferred initiator for use in the present invention.

As indicated supra, the polymeric arms in the assymetric radial polymers useful in this invention will comprise one or more conjugated diolefins, generally a conjugated diolefin having from about 4 to about 12 carbon atoms, such as 1,3-butadiene; isoprene; 2,3-dimethyl-1,3-butadiene; 3-butyl-1,3-octadiene; 1-phenyl-1,3-butadiene; 1,3-hexadiene; 4-ethyl-1,3-hexadiene and the like. 1,3-butadiene and isoprene are preferred conjugated diolefins for use in preparing the arms of the star shaped polymer useful in this invention. As also noted supra, the polymeric arms of the star shaped polymers useful in this invention may contain a monoalkenyl aromatic monomer. Suitable monoalkenyl aromatic hydrocarbon monomers include aryl-substituted olefins such as styrene, various alkyl styrenes, alkoxy-substituted styrenes, vinyl naphthylene, vinyl toluene and the like. In general, and when a monoalkenyl aromatic hydrocarbon monomer is used, the amount actually used will, generally, be less than about 35% wt based on polymer, preferably less than about 20% wt based on polymer to insure that the arms retain elastic properties.

Suitable solvents useful for the preparation of the arms of the star shaped polymers of this invention include hydrocarbons such as paraffins, cyclo-paraffins, alkyl-substituted cyclo-paraffins, aromatics and alkyl-substituted aromatics containing from about 4 to about 10 carbon atoms per molecular (at least 3 when cyclic and at least 6 when aromatic), and the like. Suitable solvents include benzene, toluene, cyclohexane, methylcyclohexane, n-butane, n-hexane, n-heptane and the like.

As also indicated supra, the arms prepared in steps a) and b) will be coupled by reaction, preferably, with a polyalkenyl coupling agent. Polyalkenyl coupling agents capable of forming star shaped polymers are, of course, well known in the prior and several are disclosed in U.S. Pat. Nos. 3,985,830; 4,391,949 and 4,444,953; Canadian Patent No. 716,645 and British Patent No. 1,025,295. In general, suitable polyalkenyl coupling agents contain at least two non-conjugated alkenyl groups. The non-conjugated alkenyl groups are usually attached to the same or a different electron withdrawing group such as an aromatic nucleus. Suitable polyalkenyl coupling agents have the property that at least two of the alkenyl groups are capable of independent reaction with different living polymers and in this respect are different from conjugated dienes. In preparing the star shaped polymers of this invention, pure or technical grade polyalkenyl coupling agents may be used. Suitable polyalkenyl coupling agents may be aliphatic, cyclic or aromatic. The list of useful polyalkenyl coupling agents recited in the aforesited patents includes divinyl benzene which is particularly preferred for use in the present invention.

Hydrogenation of the star shaped polymer useful in the present invention may be accomplished using any of the techniques known in the prior art. In general, these techniques involve the use of a suitable catalyst, particularly a catalyst or catalyst precursor comprising a Group VI or Group VIII metal atom. Suitable catalysts are described in U.K. Patent Specification No. 1,030,306, the disclosure of which patent specification is herein incorporated by reference. When the arms are copolymers comprising both conjugated diolefins and monoalkenyl aromatic hydrocarbons, a particularly preferred method for selectively hydrogenating the star shaped polymer such that the ethylenic unsaturation is selectively converted is described in U.S. Pat. No. 3,700,633, the disclosure of which patent is also herein incorporated by reference. The selectively hydrogenated asymmetric star shaped polymer of this invention may be added to a variety of oils including crude oils, lubricating and fuel oils to produce oil compositions, particularly lubricating and fuel oil compositions, generally having improved viscosity index characteristics. For example, the selectively hydrogenated star shaped polymers may be added to oil such as middle distillate fuels, synthetic and natural lubricating oils, crude oils and industrial oils. In general, the concentration of the selectively hydrogenated star shaped polymer in such oils may vary between wide ranges with amounts within the range from about 0.05 to about 15% wt polymer based on polymer plus total oil being most common. Concentrations within the range from about 0.1 to about 5% wt polymer based on polymer plus total oil are preferred and concentrations within the range from about 0.4 to about 2.0% wt polymer based on polymer plus total oil are most preferred. Lubricating oil compositions prepared with the selectively hydrogenated star shaped polymers of this invention may also contain other additives such as anti-corrosive additives, antioxidants, detergents, pour-point depressants, one or more additional VI Improvers and the like. Typical additives which are useful in the lubricating oil compositions of this invention and their description will be found in U.S. Pat. Nos. 3,772,196 and 3,835,083, the disclosure of which patents are herein incorporated by reference.

While the inventor does not wish to be bound by any particular theory, it is believed that the oil film thickness increases as a result of increased elasticity of the polymer due to the combined longer arms and shorter arms. As also indicated infra, this increase in elasticity (relaxation time) and reduction in HTHSR viscosity is achieved without any change in a fluids mechanical shear stability. This surprising effect is also apparently due to the different arm peak molecular weights within the same polymer.

PREFERRED EMBODIMENT OF THE INVENTION

In a preferred embodiment of the present invention, the star shaped polymer will have from about 1 to about 10 long arms, said long arms having a peak molecular weight within the range from about 60,000 to about 130,000, and from about 10 to about 20 short arms, said short arms having a peak molecular weight within the range from about 30,000 to about 80,000, and the peak molecular weight ratio of long arms to short arms will be within the range from about 1.5:1 to about 3.0:1. The preferred star shaped polymer will be used in a lubricating oil composition at a concentration within the range from about 0.4 to about 2.0 weight percent based upon polymer and total oil to produce an automotive lubricating oil.

Having thus broadly described the present invention and a preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, five star-shaped polymers were prepared for subsequent testing as viscosity index improvers. Each of the star-shaped polymers had a long (high molecular weight) and short (low molecular weight) arm of polyisoprene. In each case, the star shaped polymer was prepared by combining long arms with short arms such that the long arms ranged from 12 to 48% and then reacting the blend of long arms and short arms with a sufficient amount of divinyl benzene to produce star-shaped polymers having a varying number of arms as determined with gel permeation chromatograph with a low angle laser light scattering (LALLS) detector. The polyisoprene arms were prepared by polymerizing isoprene in the presence of a s-butyl lithium and the living polymer arms were then reacted with a divinyl benzene coupling agent. For convenience, these star-shaped polymers are referred to hereinafter as polymers nos. 1-5. After preparation, the polymers were formulated into 10W-40 oils and the difference in first normal stress, was determined at $10^6$, $s^{-1}$ using a lodge stress meter and this value together with the high temperature, high shear rate (HTHSR) viscosity of the oil, measured at $10^6$, $s^{-1}$ then used to calculate a compliance, J, and a relaxation time in microseconds. The properties actually obtained for each polymer are summarized in the following table:

TABLE

|  | Star-Shaped Polymer No. | | | | |
| --- | --- | --- | --- | --- | --- |
|  | 1 | 2 | 3 | 4 | 5 |
| Short Arms, $\overline{Mw}$ | 54 | 7.5 | 63 | 62 | 66 |
| Long Arms, $\overline{Mw}$ | 91 | 40.0 | 114 | 125 | 182 |
| % Long Arms | 12.2 | 47.8 | 37.8 | 12.2 | 37.8 |
| Normal Stress Difference, kPa | 5.97 | 4.09 | 9.19 | 10.08 | 9.02 |
| Compliance, J, $10^{-4} Pa^{-1}$ | 2.39 | 1.47 | 4.29 | 4.95 | 4.84 |
| Relaxation Time, Microseconds | 0.84 | 0.55 | 1.40 | 1.58 | 1.48 |
| Total No. of Arms by LALLS | — | 19.9 | 10.6 | 12.8 | — |

EXAMPLE 2

In this example, the elastic properties of four conventional star shaped polymers were determined using the same techniques as were used in Example 1. Specifically, the difference in the first normal stress and high shear rate viscosities were determined and the compliance and relaxation time then calculated. In referring to the star shaped polymers of this example as conventional, what is meant is that all of the arms in the polymer are the same or at least approximately the same molecular weight. For convenience, the four conventional polymers are hereinafter referred to as polymer nos. 6-9. The molecular weight of the arms of each of the conventional polymers and the elastic properties actually determined are summarized in the next table:

TABLE

| | Conventional Polymer No. | | | |
|---|---|---|---|---|
| | 6 | 7 | 8 | 9 |
| Short Arm, $\overline{M_w}$ | 35 | 46 | 58 | 80 |
| Long Arm, $\overline{M_w}$ | — | — | — | — |
| Normal Stress Difference, kPa | 4.06 | 4.44 | 6.05 | 7.00 |
| Compliance, J, $10^{-4}Pa^{-1}$ | 1.49 | 1.73 | 2.50 | 3.14 |
| Relaxation Time, Microseconds | 0.55 | 0.62 | 0.87 | 1.05 |
| Total No. of Arms by LALLS | — | — | — | 12.3 |

As will be apparent from the data summarized in the preceding table, the elastic properties of a conventional star shaped polymer will increase with increasing molecular weight of the arms.

EXAMPLE 3

In this example, portions of polymers identical to those tested in Example 1 and Example 2 were used as VI improvers in a 10W-40 multigrade lubricating oil composition. Each of the 10W-40 multigrade lubricating oil compositions was prepared with an oil base stock containing 28 w % HVI 200N oil. The 10W-40 oils also contain 7.75 w % of an LZ 7573 additive package available commercially from Lubrizol and 0.3 w % acryloid 160 pour point depressant and the remainder HVI 100N oil. After preparation of the 10W-40 oils, the high temperature, high shear rate viscosity at 150° C. and $10^6$ $S^{-1}$ shear rate as determined in the tapered varying similator (ASTM-D 4683) was determined as was the kinematic viscosity at 100° C. and the viscosity loss from mechanical shearing using ASTM-D 3945. The HTHSR viscosity actually determined was then coupled with the relaxation time determined in examples 1 and 2 and used to determine the bearing oil film thickness that would be expected in a V8 engine using equation coefficient taught by Bates et al. in SAE paper 860376. The values for each of the variables determined or calculated are summarized in the following table:

TABLE

| | Polymer No. | | | | | | | | |
|---|---|---|---|---|---|---|---|---|---|
| | 1 | 2 | 3 | 4 | 5 | 6 | 7 | 8 | 9 |
| Kinematic viscosity, 100° C. | 13.86 | 13.89 | 13.89 | 13.93 | 13.89 | 14.20 | 13.90 | 13.99 | 14.09 |
| HTHSR viscosity, 150° C. | 3.53 | 3.72 | 3.27 | 3.19 | 3.05 | 3.69 | 3.58 | 3.48 | 3.34 |
| Viscosity Loss, % | 17.3 | — | 34.2 | 35.2 | 40.2 | 2.4 | 4.6 | 17.9 | 33.3 |
| Film Thickness, micrometers | 2.78 | 2.53 | 3.29 | 3.45 | 3.26 | 2.52 | 2.54 | 2.78 | 2.92 |

As will be apparent from the data summarized in the preceding table, all of the polymers lead to the production of multigrade lubricating oil compositions which exhibited viscosity losses well within the range normally demonstrated by commercial multigrade lubricating oil compositions; viz. 0 to 40%. All of the multigrade lubricating oil compositions also had reasonable HTHSR viscosity values and those prepared with the star-shaped polymers having the longer arms; viz. polymer numbers nos. 3, 4 and 5, and the greater ratio of molecular weight between the high and low molecular weight arms (i.e. ~2:1 to 3:1) and >12% long arms had relatively low HTHSR viscosity values. These three multigrade lubricating oil compositions would, then, be expected to provide maximum fuel efficiency among the multigrade oils prepared in this example. Also, the same three oils would be expected to afford maximum bearing protection since they have the highest calculated film thickness.

EXAMPLE 4

In this example, three API SG quality SAE 5W-30 oils containing the same API SG/CE performance package were tested to determine the relative fuel savings benefits thereof. The first of the three oils hereinafter identified as oil no. 10 was prepared using a commercially available VI improver; viz., SHELLVIS® 40 while the second was prepared with oil no. 6 from Example 2 and the other with oil no. 4 from Example 1. The relative fuel efficiency was determined using a sequence VI engine test, which is an industrial-approved test to evaluate lubricant fuel savings.

A. The 10W-30 oils were tested for kinematic viscosity at 40° and 100° C.; viscosity index; the cold cranking simulator (CCS) viscosity; the high temperature high shear rate (HTHSR) viscosity cP and the relative fuel economy. In determining the relative fuel efficiency, oil No. 10 was designated the base oil and assigned a value of zero. The results actually obtained are summarized in the following Table.

TABLE

| | Oil No. | | |
|---|---|---|---|
| Properties | 4 | 6 | 10 |
| KV@ 40° C., cSt | 61.16 | 62.32 | 64.36 |
| KV@ 100° C., cSt | 10.54 | 10.65 | 10.97 |
| VI | 1.63 | 162 | 163 |
| CCS @ −25° C., cP | 31.50 | 3200 | 35.50 |
| HTHSRµ, cP | 2.85 | 3.14 | 2.95 |
| Relative Fuel Economy (95% Confidence) | +0.24 (±0.62) | −0.85 (±0.62) | 0 |

As will be apparent from the data summarized in the foregoing Table, the oil containing the commercial VI improver (Oil #10) was, then, substituted for the reference oil normally used in such tests and if this oil is assumed to be the base, the lubricating oil composition containing polymer no. 6 had a negative relative fuel economy of 0.85 in comparison to the lubricating oil composition containing polymer no. 10 while the lubricating oil composition containing polymer no. 4 had a positive relative fuel economy of 0.24 in comparison to the lubricating oil composition containing polymer no. 10. Consistent with expectation, then, the asymmetric polymers of this invention having improved elasticity as reflected by the relaxation time and providing a greater oil film thickness do, indeed, provide improved fuel efficiency.

B. As also apparent from the foregoing Table, oil No. 4 had a good HTHSRµ (lower) when compared to oil Nos. 6 and 10.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. An oil composition containing a hydrogenated radial polymer comprising a plurality of arms, said arms being of two distinctly different peak molecular weights as measured by gel permeation chromatography with a low angle laser light scattering detector, wherein said arms are homopolymers of polyisoprene, wherein the peak molecular weight of the longer polymer arms is within the range from about 40,000 to about 200,000 and the peak molecular weight of at least a first set of lower molecular weight arms is within the range from about 5,000 to about 80,000, and wherein the weight ratio of said at least two distinctly different molecular weight arms is within the range from about 2.0:1 to about 3.0:1.

2. The oil composition of claim 1 wherein the peak molecular weight of the longer polymer arms is within the range from about 60,000 to about 130,000 and the peak molecular weight of the first set of lower molecular weight arms is within the range from about 30,000 to about 80,000.

* * * * *